US006708089B2

(12) United States Patent
Hashimoto et al.

(10) Patent No.: US 6,708,089 B2
(45) Date of Patent: Mar. 16, 2004

(54) ON-VEHICLE ELECTRONIC CONTROLLER

(75) Inventors: Kohji Hashimoto, Tokyo (JP); Katsuya Nakamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/299,794

(22) Filed: Nov. 20, 2002

(65) Prior Publication Data

US 2003/0216841 A1 Nov. 20, 2003

(30) Foreign Application Priority Data

May 20, 2002 (JP) .................................... P2002-144929

(51) Int. Cl.[7] ................................................ G06F 7/00
(52) U.S. Cl. ........................................................ 701/1
(58) Field of Search ............................... 701/1, 29, 36, 701/102, 115; 123/406.6, 406.65, 406.66, 438; 326/37–39, 41, 47, 101

(56) References Cited

U.S. PATENT DOCUMENTS 4,408,279 A * 10/1983 Imai et al. .................. 701/105
RE32,163 E * 5/1986 Tokuda et al. .............. 701/114
RE32,286 E * 11/1986 Imai et al. .................. 701/102
6,249,152 B1 6/2001 Tanaka et al.

FOREIGN PATENT DOCUMENTS

| | | |
|---|---|---|
| JP | 5119811 | 5/1993 |
| JP | 7013912 | 1/1995 |
| JP | 2002-43850 | 2/2002 |
| JP | 2002-92402 | 3/2002 |

* cited by examiner

*Primary Examiner*—Thu V. Nguyen
(74) *Attorney, Agent, or Firm*—Sughrue Mion, PLLC

(57) ABSTRACT

The invention relates to an on-vehicle electronic controller and intends to lighten the burden on a microprocessor in processing input and output of the controller and miniaturize and standardize the controller. A plurality of ON/OFF data inputted from indirect input interface circuits are transmitted to a RAM memory via a variable filter circuit and a two-way serial communication circuit. A filter constant of the variable filter circuit is set by a constant setting register, and a filter constant stored in the nonvolatile memory is stored in the constant setting register via two-way serial communication circuit.

9 Claims, 9 Drawing Sheets

101: POWER SUPPLY
116, 126: PS CONVERSION
117: TRANSFER IF
121a: BUFFER
121b: TIME-OUT CHECK
122a: SUM CHECK
123a: COMMAND DECODER
123b: CHIP SELECT
127: CLOCK GENERATOR
129a: ABNORMALITY STORAGE
135a, 135b: SET
136: STABILIZING CIRCUIT

101: POWER SUPPLY
116, 126: PS CONVERSION
117: TRANSFER IF
121a: BUFFER
121b: TIME-OUT CHECK
122a: SUM CHECK
123a: COMMAND DECODER
123b: CHIP SELECT
127: CLOCK GENERATOR
129a: ABNORMALITY STORAGE
135a, 135b: SET
136: STABILIZING CIRCUIT

135a: SET VALUE
222, 222a: REFERENCE VOLTAGE

222: REFERENCE VOLTAGE
503a: SET VALUE
503b: CURRENT VALUE

ON-VEHICLE ELECTRONIC CONTROLLER

BACKGROUND OF THE INVENTION

1. Field of the Invention

The present invention relates to an on-vehicle electronic controller incorporating a microprocessor used for controlling fuel supply of a vehicle engine and so on. The invention particularly relates to an on-vehicle electronic controller that is improved in handling a large number of input/output signals and in standardizing the controller regarding the control on various types of vehicles.

2. Description of the Related Art

FIG. 9 is a typical general block circuit diagram showing one of conventional on-vehicle electronic controllers of this type. An ECU (engine control unit) 1 comprised of a single printed circuit board includes a LSI (integrated circuit) 2 as a main component. In the LSI 2, a CPU (microprocessor) 3, a nonvolatile flash memory 4, a RAM memory 5, an input data selector 6, an A/D converter 7, an output latch memory 8 and so on are connected via a data bus 30. The ECU 1 operates in response to a control power supplied from a power supply unit 9, which is fed from an on-vehicle battery 10 via a power supply line 11 and a power switch 12. An execution program, a control constant for controlling an engine, and so on are stored in the nonvolatile flash memory 4 in advance.

Meanwhile, a large number of ON/OFF input signals from various sensor switches 13 are supplied from a bleeder resistors 14 serving as a pull-up or pull-down resistance, to comparators 19 via series resistors 15 and parallel capacitors 16 that constitutes a noise filter. Input resistors 17 and reaction resistors 18 are connected to the comparator 19. When a voltage across the parallel capacitors 16 exceeds a reference voltage applied to a negative terminal of the comparator 19, a signal of logic 'H' is supplied to the data selector 6. However, when decreasing the voltage across the parallel capacitors 16, the input from the reaction resistor 18 is added thereto. Therefore, the output of the comparator 19 returns to logic 'L' since the voltage further decreases to less than the reference voltage. As described above, the comparator 19 acts as a level judging comparator including a hysteresis function, and a large number of outputs from the comparators 19 are stored in the RAM memory 5 via the data selector 6 and the data bus 30.

In addition, for example, the mentioned data selector 6 handles an input of 16 bits and outputs the input to the data bus 30 when receiving a chip select signal from the CPU 3. Input points range over several tens points, and a plurality of data selectors are used.

Further, a large number of analog signals from various analog sensors 20 are supplied to the A/D converter 7 via series resistors 21 and parallel capacitors 22 that constitute a noise filter. Digital outputs from the A/D converter that receive chip select signals from the CPU 3 are stored in the RAM memory 5 via the data bus 30. Control outputs from the CPU 3 are stored in the latch memory 8 via the data bus 30 and drive external loads 26 via output transistors 23. To cope with a large number of control outputs, a plurality of latch memories are used, and the control outputs are stored in the latch memories chip-selected by the CPU 3.

Reference numeral 24 is driving base resistors of the transistors 23, numeral 25 is stable resistors connected between base/emitter terminals of the transistors 23, numeral 27 is an output contact of a feeding power supply relay for the external loads 26.

The conventional apparatus of above arrangement has problems as follows. The LSI 2 becomes large in size because the CPU 3 handles a large number of inputs and outputs. The parallel capacitors 16 acting as a noise filter require capacitors having a variety of capacities to secure a desired filter constant, thereby causing a difficulty in standardization, and it is necessary to employ a large capacitor to secure a large filter constant, increasing the ECU 1 in size.

As a measure for reducing the input/output terminals of the LSI 2 to miniaturize the LSI 2, for example, Japanese Patent Laid-Open (unexamined) No. 13912/1995 specification "Input/Output Processing IC" discloses a method of time-sharing and transferring a large number of input/output signals using a serial communication block.

However, this method requires a noise filter of various capacities and is not suitable for standardization of the device. Moreover, a capacitor demands a large capacity to obtain a sufficient filter constant and is not suitable for miniaturization of the device.

Meanwhile, a concept has been publicly known in which a digital filter is used as a noise filter for ON/OFF input signals and the filter constant is controlled by a microprocessor. For example, in "Programmable Controller" disclosed in Japanese Patent Laid-Open (unexamined) No. 119811/1993 specification, when any input logic value of an external input signal subjected to sampling is successively set at the same value for more than one time, the signal is adopted and stored in an input image memory, and a filter constant changing command is provided for changing a sampling period.

In this method, although a filter constant can be freely changed, a microprocessor bears a large burden in handling a large number of input signals, resulting in slower response of control.

As another example of a digital filter for ON/OFF input signals, Japanese Patent Laid-Open (unexamined) No. 89974/2000 specification discloses "Data Storage Control Circuit", in which a shift register is provided as hardware and sampling is carried out according to the same concept as described above.

As described above, however, the mentioned conventional is partially but is not fully miniaturized and standardized in an integral manner. Particularly, in case of miniaturizing and standardizing an input/output circuit of the microprocessor, it is not possible to avoid reduction in original control capability and response of the microprocessor.

SUMMARY OF THE INVENTION

In order to solve the above-discussed problems, the first object of the present invention is to provide an on-vehicle electronic controller capable of reducing a burden of a microprocessor in processing input and output to improve its original control capability and response and achieving entire miniaturization and standardization of the controller by reducing an input filter in size.

The second object of the invention is to provide an on-vehicle electronic controller capable of changing a control program and a control constant for various types of vehicle each having different control specifications so as to readily standardize the hardware in a more effective manner.

An on-vehicle electronic controller according to the invention includes a microprocessor having a nonvolatile memory, in which a control program for a controlled vehicle and a control constant are written by an external tool, and a RAM memory for computation. The mentioned on-vehicle electronic controller also includes direct input interface circuits and direct output interface circuits that are connected to a data bus of the mentioned microprocessor and handle high-speed inputs and outputs for engine drive control. The mentioned on-vehicle electronic controller further includes a first serial-parallel converter connected to the mentioned microprocessor via a data bus, a second serial-parallel converter serially connected to the mentioned first serial-parallel converter, and a communication control circuit for serial communication connected to the mentioned second serial-parallel converter via a data bus. The mentioned on-vehicle electronic controller further includes an output latch memory for storing control output signals transmitted via the mentioned first/second serial-parallel converter with respect to low-speed output signals of an auxiliary driving output and an alarm display output, and indirect output interface circuits each connected to an output terminal of the mentioned output latch memory. Furthermore, the mentioned on-vehicle electronic controller includes indirect input interface circuits each having a variable filter circuit provided with constant setting registers in which a filter constant is stored, and to which manually controlled low-speed input signals are inputted. In the mentioned on-vehicle electronic controller, a plurality of ON/OFF information data inputted via the mentioned indirect input interface circuits are serially transmitted to the mentioned RAM memory, and the filter constant of the control constant stored in the mentioned nonvolatile memory is serially transmitted to the mentioned constant setting registers.

In the on-vehicle electronic controller of above constitution, signals inputted via the indirect input interface circuits having the variable filter circuit are serially transmitted to the microprocessor, and the filter constant of the control constant stored in the nonvolatile memory is serially transmitted to the constant setting registers of the mentioned variable filter circuit.

As a result, number of the input/output pins of the microprocessor is largely reduced, and consequently the apparatus becomes small-sized and inexpensive. Furthermore, it is no more necessary to use any large-capacity capacitor of various capacities for the input filter, and consequently the indirect input interface circuit section is effectively miniaturized and standardized.

In particular, because control program and control constant conforming to the type of controlled vehicle are set in the nonvolatile memory in a collective manner, it is now possible to achieve standardization with a high degree of freedom.

It is also possible to lighten the burden of the microprocessor in processing inputs and outputs and improve its original control capability and response.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
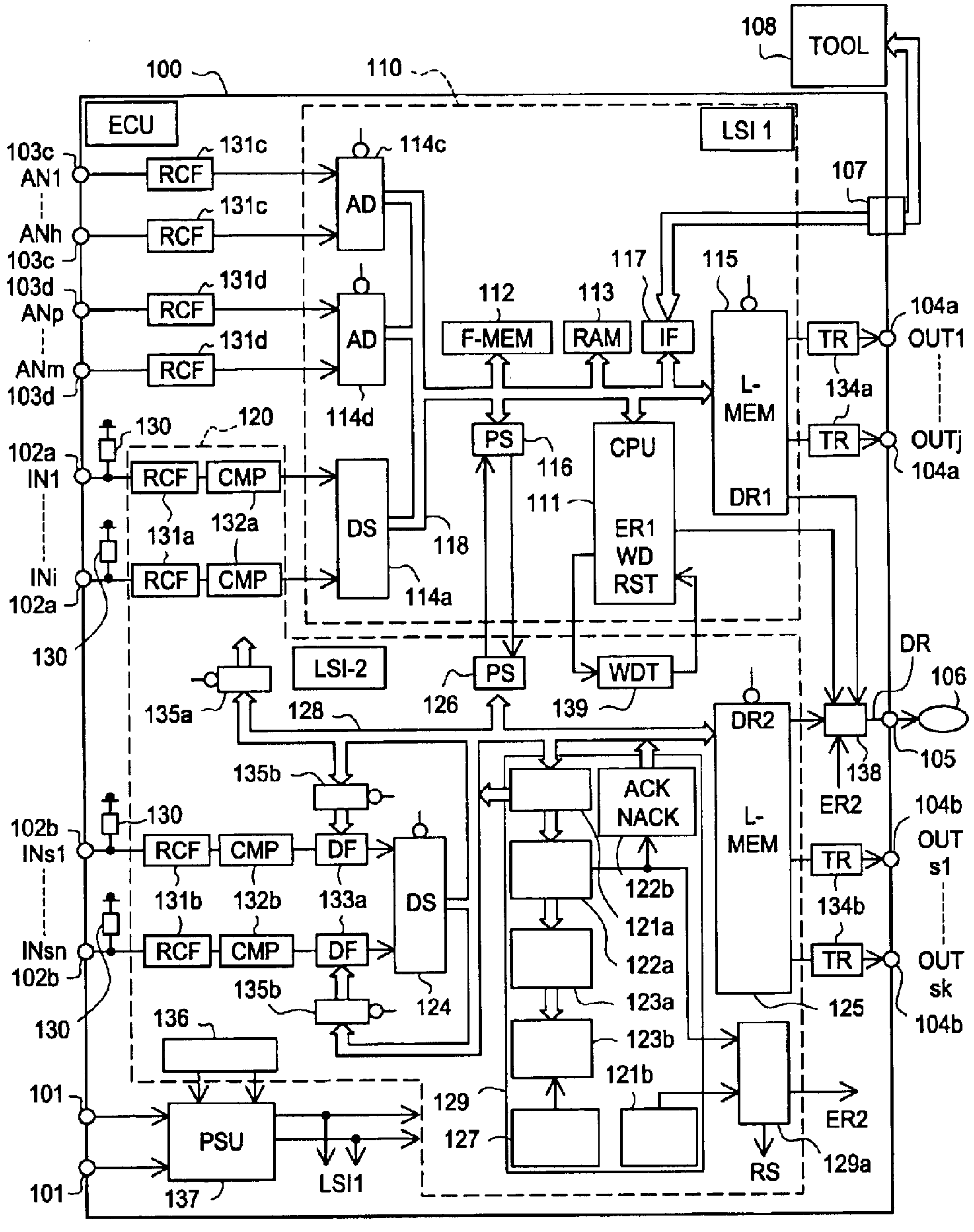
FIG. 1 is a block circuit diagram entirely showing an on-vehicle electronic controller according to Embodiment 1 of the present invention.

Description of Arrangement of Embodiment 1:

FIG. 1 is a block circuit diagram entirely showing an on-vehicle electronic controller according to Embodiment 1 of the invention. In FIG. 1, numeral 100 is an ECU (on-vehicle electronic controller), which is comprised of a single electronic circuit board including a first LSI (first integrated circuit) 110 and a second LSI (second integrated circuit) 120 as main components.

Numeral 101 is a power supply terminal connected to an on-vehicle battery and is comprised of a terminal supplied with a power via a power switch not shown and a sleep terminal directly supplied with a power from the on-vehicle battery for the purpose of maintaining operation of a memory described later.

Numeral 102*a* is connector terminals where high-speed input signals IN1 to INi for ON/OFF operations are inputted. The signals are provided for carrying out relatively high frequent operations of a crank angle sensor for controlling timing of igniting an engine and timing of injecting fuel, a speed sensor for controlling auto cruising, and so on, and the signals need to be captured immediately.

Numeral 102*b* is connector terminals where low-speed input signals INs1 to INsn for ON/OFF operations are inputted. The signals are provided for carrying out relatively less frequent operations of a selector switch for detecting a position of a speed change lever, a switch of an air conditioner, and so on. The operations are not seriously affected by delay in capturing signals.

Numerals 103*c* and 103*d* are connector terminals where analog input signals AN1 to ANh and ANp to ANm are inputted. The signals are provided for carrying out relatively slow operations of a sensor such as an accelerator position sensor, a throttle position sensor, a coolant temperature sensor, an oxygen concentration sensor for exhaust gas, an airflow sensor, and so on.

Numeral 104*a* is a connector terminal where high-speed outputs OUT1 to OUTj for ON/OFF operations are outputted. The signals are provided for carrying out relatively frequent operations of ignition coil driving output of an engine, solenoid valve driving output for controlling injection of fuel, and so on. Driving output needs to be generated without delay.

Numeral 104*b* is a connector terminal where low-speed outputs OUTs1 to OUTsk for ON/OFF operations are outputted. The signals are provided for carrying out relatively frequent operations of electromagnetic clutch driving output for an air conditioner electromagnetic clutch (auxiliary machine), a display warning output, and so on. The operations are not seriously affected by delay in response of driving output.

Numeral 105 is a connection terminal of a load relay 106 whose output contact point is connected to a power supply circuit of the mentioned high-speed/low-speed outputs.

Numeral 108 is an external tool for transferring and writing a control program, a control constant, and so on in advance to the foregoing ECU 100. The external tool 108 is used during shipment of products or maintenance work and is connected to the mentioned ECU 100 via a detachable connector 107.

The first LSI 110 is composed of a microprocessor 111, a nonvolatile memory 112, a RAM memory 113, an input data selector 114*a*, an output latch memory 115, a first serial-parallel converter 116 for transmitting and receiving serial signals to and from a second LSI 120 described later, a SCI (serial communication interface) 117 for transmitting and receiving serial signals to and from the external tool 108, A/D converters 114*c* and 114*d*, and so on. Those members are connected to the microprocessor 111 by a data bus 118 of 8 to 32 bits.

In addition, the mentioned nonvolatile memory 112 is, for example, a flash memory being capable of batch writing. A transfer control program, a vehicle control program, a vehicle control constant, and so on are transferred and written from the external tool 108 via the RAM memory 113.

Analog signals inputted from the analog input terminal 103*c* are connected to the data bus 118 via a noise filter 131*c* serving as a direct input interface circuit and the multi-channel first A/D converter 114*c*. Analog signals inputted from the analog input terminal 103*d* are connected to the data bus 118 via a noise filter 131*d* serving as a direct input interface circuit and the multi-channel second A/D converter 114*d*.

In addition, although a large number of analog input signals AN1 to ANh and ANp to ANm are divided and connected to the plurality of A/D converters 114*c* and 114*d*, a part of the analog input signals are connected to both A/D converters, i.e., connected in a superposed manner. For example, the first accelerator position sensor and the first throttle position sensor are inputted to the first A/D converter 114*c*, and the second accelerator position sensor and the second throttle position sensor are inputted to the second A/D converter 114*d*, while both first and second accelerator position sensors generate the same output for detecting a degree of working of the accelerator pedal. In the same manner, both first and second throttle position sensors generate the same output for detecting an opening of the air-supplying throttle valve.

Numeral 120 is the second LSI (second integrated circuit) arranged as described below. ON/OFF signals inputted from the high-speed input terminal 102*a* are captured to the second LSI 120 via bleeder resistors 130, and are directly connected to the mentioned input data selector 114*a* via a noise filter 131*a* and a variable threshold circuit 132*a* that act as direct input interface circuits.

The noise filter 131*a* and the variable threshold circuit 132*a* will be described in detail referring to FIG. 2(*b*). Numeral 135*a* is a constant setting register where a threshold value for judging a level is stored. A large number of input data selectors 114*a* are used as required. For example, not more than eight high-speed ON/OFF input signals are connected to a single input data selector 114*a*. When the microprocessor 111 selects a chip, ON/OFF information is transmitted to the data bus 118.

In addition, each of the mentioned bleeder resistors 130 has a low resistance of several KΩ. The bleeder resistors 130 are connected to the ON/OFF input terminals IN1 to INi and INs1 to INsn on a positive side (pull-up) or a negative side (pull-down) of the power supply such that the bleeder resistors 130 act as loads on an input signal switches. The bleeder resistors 130 prevent the superposition of noise that is resulted from an input terminal when any input switch is turned off, and the bleeder resistors 130 improve reliability in contact when the input switch is a contact point.

ON/OFF signals inputted from the low-speed input terminal 102*b* are captured into the second LSI 120 via the bleeder resistors 130, and are applied to an input data selector 124 via the noise filter 131*b*, level judging comparators 132*b*, and variable filter circuits 133*a* that act as indirect input interface circuits.

The mentioned noise filter 131*b*, the level judging comparators 132*b* and variable filter circuits 133*a* will be described later referring to FIG. 2(*a*). Numeral 135*b* is a constant setting register in which a filter constant (a control constant) is stored. For example, not more than eight indirect ON/OFF input signals are applied to the input data selector 124. When an address-selecting circuit 123*b* described later selects a chip, ON/OFF information is transmitted to a data bus 128. In a case of handling more than eight ON/OFF signals, the second and third input data selectors are used and successively chip-selected to transmit ON/OFF information to the data bus 128.

Numeral 126 is a second serial-parallel converter paired with the first serial-parallel converter 116 to constitute a serial interface circuit. Numeral 121*a* is a buffer memory temporarily storing a series of information transmitted from the foregoing microprocessor 111 via the first/second serial-parallel converter 116 and 126. Numeral 121*b* is a time-out check circuit for checking whether or not the data have been received within a predetermined time. Numeral 122*a* is a data check circuit for checking data in the buffer memory 121*a*, numeral 122*b* is a data register for acknowledgment response, and numeral 123*a* is a command decoder that operates when the data check circuit 122*a* performs normal data check. Numeral 123*b* is an address-select circuit for selecting an address of data to be transmitted and received according to the content of the command decoder 123*a*, and numeral 127 is a clock generator. The mentioned buffer memory 121*a* to the clock generator 127 constitute a communication control circuit 129.

Numeral 128 is a data bus connecting the parallel terminal of the second serial-parallel converter 126, the buffer memory 121*a*, the data register 122*b* for acknowledgment response, the constant setting registers 135*a* and 135*b*, the data input selector 124, the latch memory 125 for indirect output, and so on. The method of transferring data by the communication control circuit 129 will be described later referring to FIGS. 3, 4, and 5.

Numeral 129*a* is an abnormality storage element for storing an abnormality detection state and generates an abnormality storage output ER2 when the data check circuit 122*a* detects any abnormality, when the time-out check circuit 121*b* detects any abnormality, or when a watchdog timer 139 described later generates a reset output RST. A power supply detection pulse not shown resets the abnormality storage element 129*a* at the time of turning on the power switch.

Numerals 134*a* and 134*b* are load driving transistors that constitute a direct output interface circuit or an indirect output interface circuit. The load driving transistors 134*a* and 134*b* are respectively connected between the latch memory 115 and the high-speed output terminal 104*a* and between the latch memory 125 and the low-speed output terminal 104*b*. External loads OUT1 to OUTj and OUTs1 to OUTsk are driven by output signals of the latch memories 115 and 125.

Numeral 137 is a power supply unit that is supplied with a power from the power supply terminal 101 and feeds the first LSI 110 and the second LSI 120. The power supply unit 137 is controlled by a stabilizing power supply circuit 136 and generates a predetermined constant voltage output. Numeral 138 is a logic gate circuit provided in the driving circuit of the load relay 106. A driving signal DR of the load relay 106, which is an output of the logic gate circuit 138, acts on the basis of the following logic:

$$DR=DR1*(1-ER1)*(1-ER2)*DR2$$

where:

- DR1 is a first driving signal of the load relay 106 directly instructed by the first LSI 110;
- DR2 is a second driving signal of the load relay 106 via the second LSI 120;
- ER1 is an abnormality diagnostic output of the microprocessor 111; and
- ER2 is an abnormality storage output of the abnormality storage circuit 129*a*.

Accordingly, the load relay 106 is driven by the first driving signal DR1 or second driving signal DR2. However, the first and second driving signals DR1 and DR2 become reactive when the abnormality diagnostic output ER1 is generated or the abnormality storage output ER2 is generated.

Numeral 139 is a watchdog timer that judges whether or not a pulse time width of a watchdog clear signal WD, which is a pulse train generated by the microprocessor 111, is a predetermined value, and supplies a reset output RST to the microprocessor 111 if the time width is not normal.

In addition, as analog input signals not shown, signals such as an operation confirmation signal and a load current detection signal of the output transistors 134*a* are captured into the microprocessor 111 via the first and second A/D converters 114*c* and 114*d* as signals generated in the ECU 100. The mentioned power supply unit 137, the bleeder resistors 130, the noise filters 131*c* and 131*d*, the output transistors 134*a* and 134*b*, the logic gate circuit 138, and so on are provided outside of the first LSI 110 and the second LSI 120.

Figure 2:
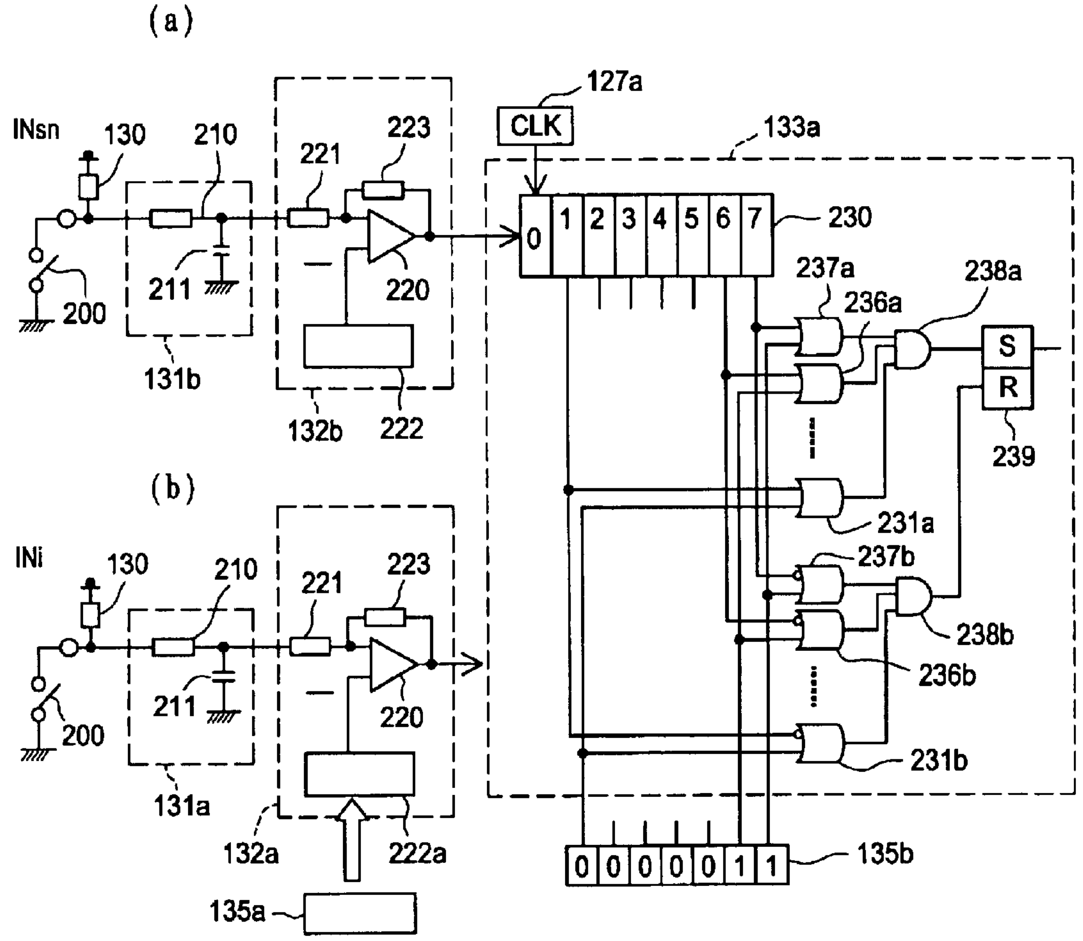
FIG. 2 is a block circuit diagram showing a variable filter in FIG. 1.

FIG. 2(*a*) is a block circuit diagram showing the variable filter circuit 133*a* in FIG. 1 and its peripheral circuit in detail. With respect to an input switch 200, the input signal INsn including the bleeder resistors 130 of low resistance are connected to a parallel small capacitor 211 of over ten pF via series resistors 210 of high resistance of hundreds KΩ, which is an upper limit of practical use. Numeral 131*b* is a noise filter composed of the series resistor 210 and the small capacitor 211, and is provided for absorbing and smoothing high-frequency noise. Numeral 132*b* is a level-judging comparator composed of an input resistor 221, a reaction resistor 223, and a comparator 220. A predetermined reference voltage 222 (voltage Von) is applied to the inverted input of the comparator 220.

Therefore, when the charging voltage of the small capacitor 211 reaches the reference voltage Von, the output of the comparator 220 becomes "H" (logic "1"). Once the output of the comparator 220 becomes 'H', the reaction resistor 223 adds an input. Therefore, unless a charging voltage of the small capacitor 211 lowers to Voff (<Von), a hysteresis function is provided such that the output of the comparator 220 is not set to "L" (logic "0"). This function is provided for preventing noise ripple, which is superposed in the small capacitor 211 from frequently inverting the output of the comparator 220.

The output of the comparator 220 is inputted to a shift register 230 constituting the variable filter circuit 133*a*, and shifting pulse input with a frequency T is supplied from a clock generator 127*a* to the shift register 230. Accordingly, the logic contents of stages following the shift register 230 are equivalent to the output logic contents of the comparator 220 at some points in the past.

Numerals 231*a* to 237*a* are first logic gate elements for ORing logic contents of the output stages of the shift register 230 and logic contents of the bits of the constant setting register 135*b*. Numeral 238*a* is an AND element for connecting the outputs of the logic gate elements 231*a* to 237*a*, and numeral 239 is an input deciding register composed of flip-flop elements set by the output of the AND element 238*a*.

Furthermore, numerals 231*b* to 237*b* are second logic gate elements for ORing inverted logic contents of the output stages of the shift register 230 and logic contents of the bits of the constant setting register 135*b*. Numeral 238*b* is an AND element for connecting the outputs of the logic gate elements 231*b* to 237*b*. The mentioned input deciding register 239 is reset by the output of the AND element 238*b*.

In the variable filter circuit 133*a* configured as described above, when the contents of the output stages of the shift register 230 are all logic "1", the output of the AND element 238*a* sets the output of the input deciding register 239 to logic 1.

However, when some contents of the constant setting register 135*b* are logic "1", the corresponding logic contents of the output stages of the shift register 230 may be set to "0". Therefore, in the example of FIG. 2(*a*), when the first stage to the fifth stage of the shift register 230 all have logic contents of "1", the output of the input deciding register 239 is set to logic "1".

Also, when the contents of the output stages of the shift register 230 are all set to logic "0", the output of the AND element 238*b* resets the output of the input deciding register 239 to logic 0. However, when some contents of the constant setting register 135*b* are logic "1", the corresponding logic contents of the output stages of the shift register 230 may be set to "1".

Therefore, in the example of FIG. 2(*a*), when the first stage to the fifth stage of the shift register 230 are all have logic contents of "0", the output of the input deciding register 239 is reset to logic '0'.

As described above, number of logic determination points for judging the input content of the input deciding register 239 is variably set according to the contents of the constant setting register 135*b*. In addition, instead of variably setting the number of logical judgment as described above, it is also preferable to variably set a pulse frequency of the clock generator 127*a*.

FIG. 2(*b*) is a block circuit diagram showing the variable threshold circuit 132*a* in FIG. 1 and its peripheral circuit in detail. With respect to the input switch 200, the input signal INi including the mentioned bleeder resistors 130 of low resistance is connected to the parallel small capacitor 211 of over ten pF via the series resistors 210 of high resistance of hundreds KΩ, which is an upper limit of practical use. Numeral 131*a* is a noise filter composed of the series resistors 210 and the small capacitor 211. The noise filter 131*a* is provided for absorbing and smoothing high-frequency noises.

Numeral 132*a* is a variable threshold circuit (variable level judging comparator) composed of the input resistors 221, the reaction resistor 223, and the comparator 220. A predetermined reference voltage 222*a* (voltage Von) is applied to the inverted input of the comparator 220, it is possible to change the reference voltage 222*a* according to the contents of the constant setting register 135*a* .

Therefore, when the charging voltage of the small capacitor 211 reaches the reference voltage Von, the output of the comparator 220 becomes "H" (logic "1"). Once the output of the comparator 220 becomes 'H', the reaction resistor 223 adds an input. Therefore, unless a charging voltage of the small capacitor 211 lowers to Voff (<Von), a hysteresis function is provided such that the output of the comparator 220 is not set to "L" (logic "0"). This function is provided for preventing noise ripple, which is superposed in the small capacitor 211 from frequently inverting the output of the comparator 220.

Changing a comparison level corresponds to changing an apparent filter constant and acts as a variable filter within a limited regulation range.

Description of Function and Operation of Embodiment 1

Figure 3:
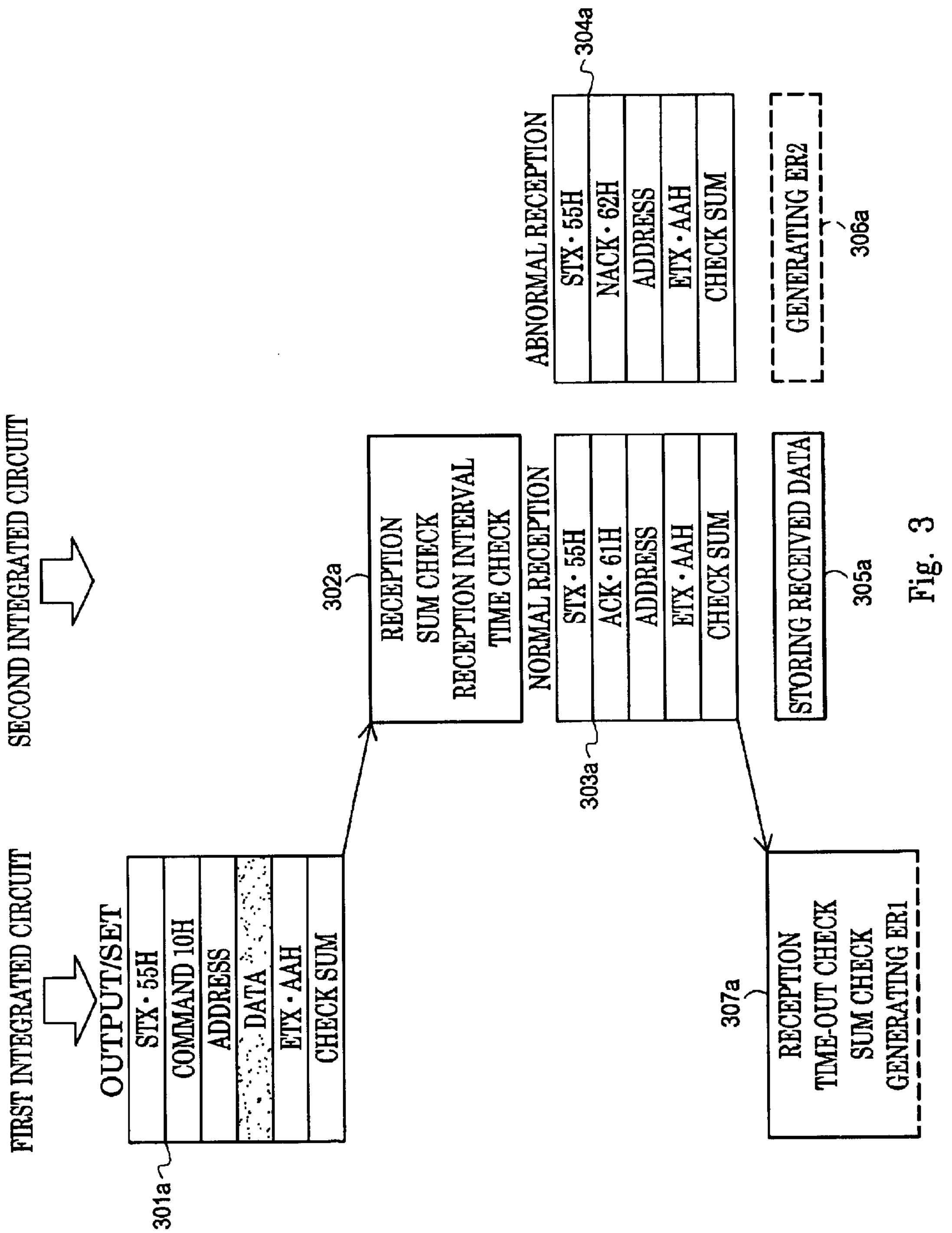
FIG. 3 is a block diagram of a frame constitution for serial communication in FIG. 1, and shows a case of transmitting an indirect output signal.

In Embodiment 1 of the invention constituted as shown in FIG. 1, first the frame constitution diagram of serial communication shown in FIG. 3 is hereinafter described. FIG. 3 shows a frame constitution in case of transmitting an indirect output signal from the first LSI 110 (master station) to the second LSI 120 (substation). A regular transmission frame 301*a* for transmission from the master station to the substation is composed of start data 55H, a command 10H, a storage destination address, transmission data, end data AAH, and check sum data. Numeral 302*a* is a judgment block in which the second LSI 120 receives a series of data from the mentioned regular transmission frame 301*a*, the data check circuit 122*a* of the communication control circuit 129 in FIG. 1 carries out sum check, and the time-out check circuit 121*b* carries out time-out check of receiving intervals.

Numeral 303*a* is a normality reply frame sent back to the master station when the judgment block 302*a* judges a reception as being normal. The normality reply frame 303*a* is composed of start data 55H, recognition data 61H, a storage destination address, end data AAH, and check sum data. Numeral 304*a* is an abnormality reply frame sent back to the master station when the judgment block 302*a* judges a reception as being abnormal. The abnormality reply frame 304*a* is composed of start data 55H, non-recognition data 62H, storage destination addresses, end data AAH, and check sum data.

Numeral 305*a* is a block where a received indirect output signal is stored in the latch memory 125 after sending back the normality reply frame 303*a*. Numeral 306*a* is a block where the abnormality storage circuit 129*a* generates an abnormality storage output ER2 according to a signal from the communication control circuit 129 after sending back the abnormality reply frame 304*a*. Actually the abnormality storage output ER2 is generated after the retransmission confirmation processing.

Numeral 307*a* is a diagnostic block for carrying out sum check on the normality reply frame 303*a* when the master station received from the substation the normality reply frame 303*a* or the abnormality reply frame 304*a* or carrying out time-out check of reply response when the master station failed to receive any of the frames. If a result of diagnosis by the diagnostic block 307*a* shows any abnormality, an abnormality diagnosis output ER1 described later is generated. Furthermore, if the abnormality still continues despite that the diagnostic block 307*a* normally received the abnormality reply frame 304*a* and the regular transmission frame 301*a* was transmitted again, an abnormality diagnosis output ER1 described later is generated.

In addition, at the time of transmitting and setting a filter constant or a threshold constant, i.e., a control constant to the constant setting register, number of the constant setting registers is specified and the filter constant or the threshold constant is stored as data according to an address of the mentioned regular transmission frame 301*a*.

Figure 4:
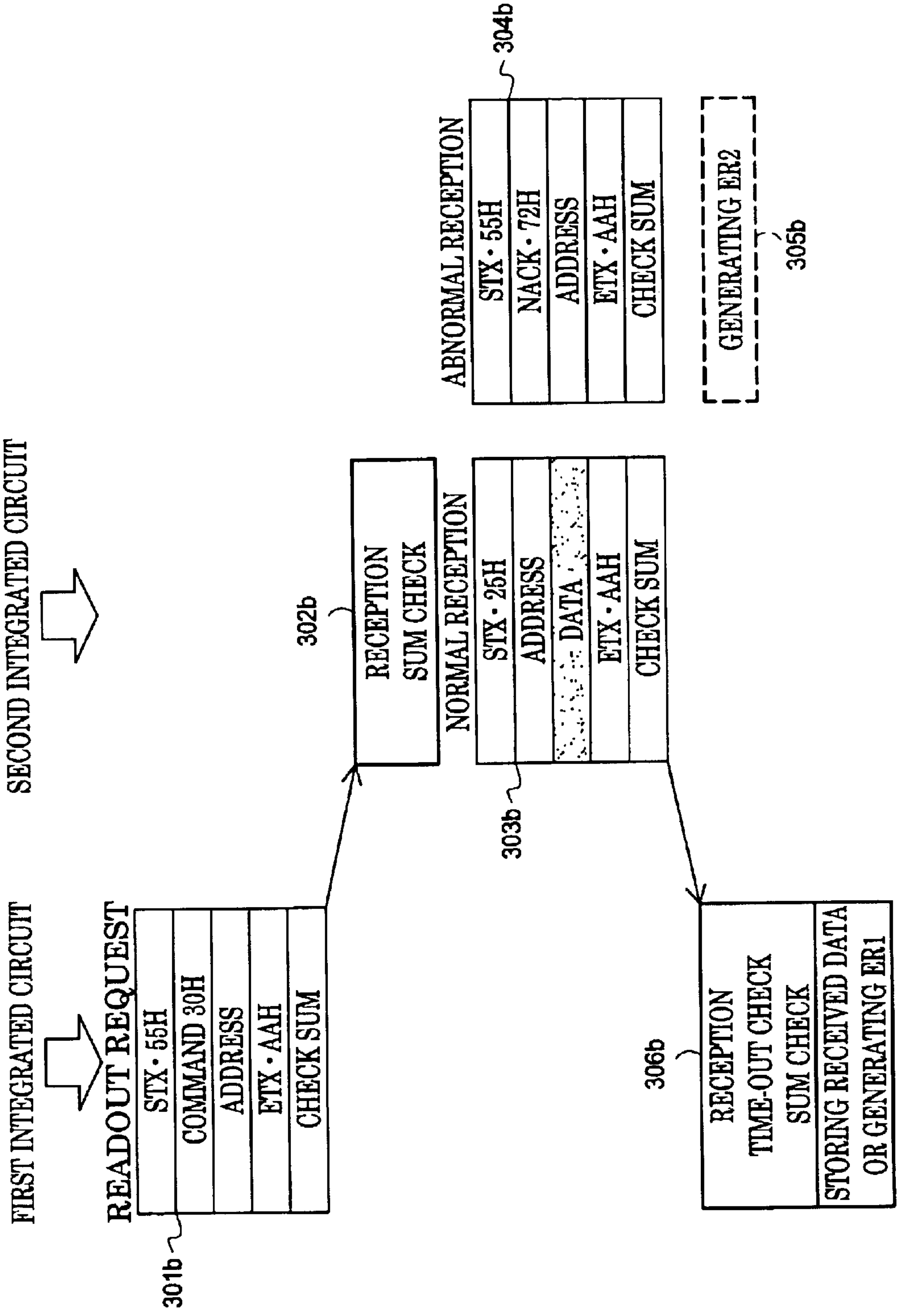
FIG. 4 is a block diagram of a frame constitution for serial communication in FIG. 1, and shows a case of requesting readout.

FIG. 4 shows a frame constitution when the first LSI 110 (master station) requests the second LSI 120 (substation) to read out various data (readout from the substation to the master station). The readout request begins with transmitting an irregular transmission frame 301*b* from the master station to the substation. The irregular transmission frame 301*b* is composed of start data 55H, command 30H, readout destination addresses, end data AAH, and check sum data.

Numeral 302*b* is a judgment block where the second LSI 120 receives a series of data from the irregular transmission frame 301*b*, and the data check circuit 122*a* of the communication control circuit 129 in FIG. 1 carries out sum check.

Numeral 303*b* is a normality reply frame sent back to the master station when the judgment block 302*b* judges a reception as being normal. The normality reply frame 303*b* is composed of start data 25H, readout destination addresses, readout data, end data AAH, and check sum data. Numeral 304*b* is an abnormality reply frame sent back to the master station when the judgment block 302*b* judges a reception as being abnormal. The abnormality reply frame 304*b* is composed of start data 55H, non-recognition data 72H, readout destination addresses, end data AAH, and check sum data. Numeral 305*b* is a block where the abnormality storage circuit 129*a* generates an abnormality storage output ER2 according to a signal from the communication control circuit 129 after sending back the abnormality reply frame 304*b*. Actually the abnormality storage output ER2 is generated after the retransmission confirmation processing.

Numeral 306*b* is a diagnostic block for carrying out sum check when the master station received a normality reply frame 303*b* or an abnormality reply frame 304*b* sent back by the substation or carrying out time-out check of reply response when the master station failed to receive the normality reply frame 303*b* or the abnormality reply frame 304*b*. If a diagnostic result of the diagnostic block 306*b* is abnormal, an abnormality diagnosis output ER1 described later is generated. Furthermore, if the abnormality still continues despite that the diagnostic block 306*b* normally received an abnormality reply frame 304*a* and the regular transmission frame 301*b* was transmitted again, the abnormality diagnosis output ER1 described later is generated.

Figure 7:
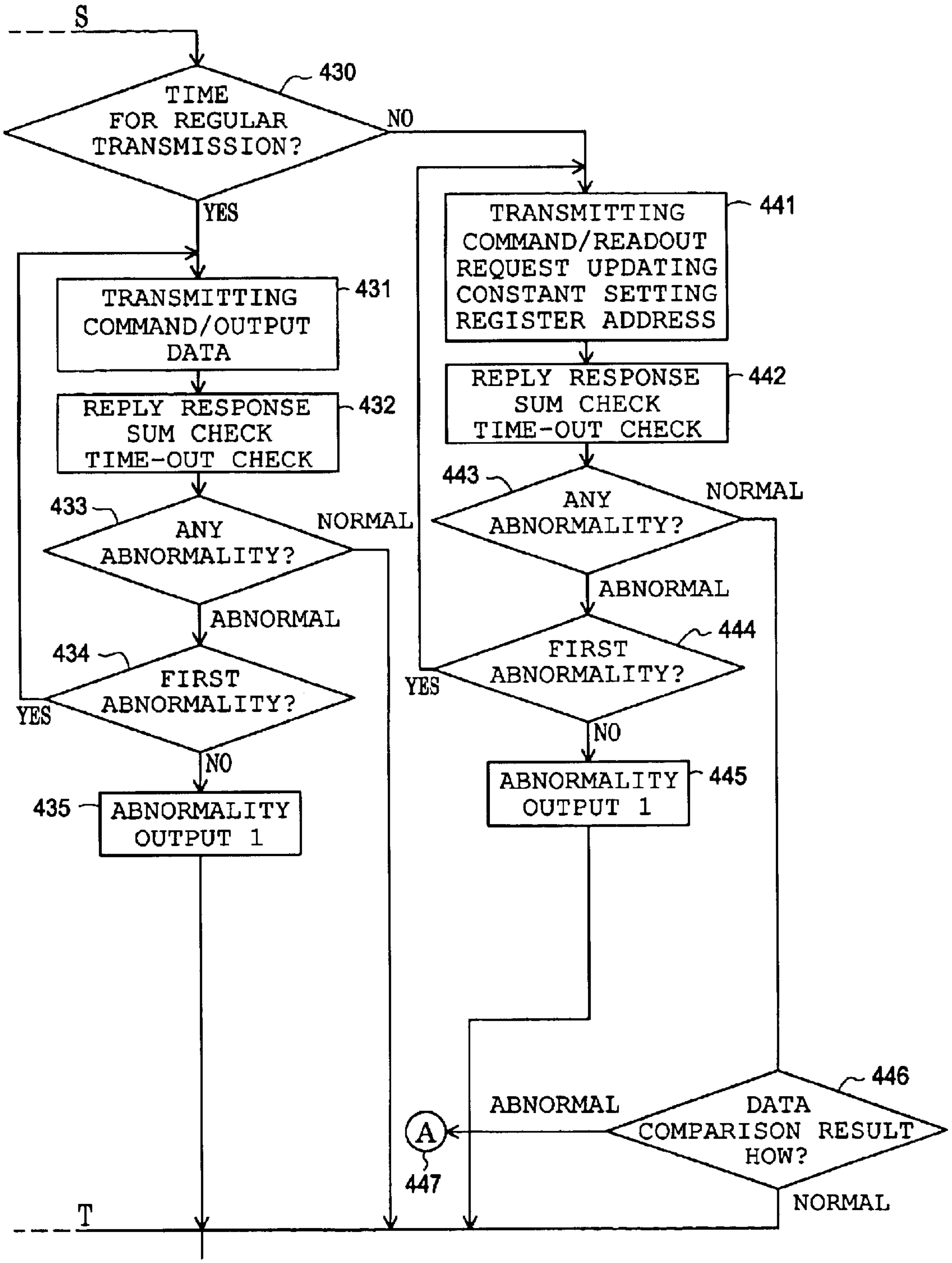
FIG. 7 is a flowchart for explaining the operation of communication in FIG. 1.

When the foregoing diagnostic block 306*b* normally received the normality reply frame 303*b*, the received data normally read out is temporarily stored and used for comparison shown in step 446 in FIG. 7.

Figure 5:
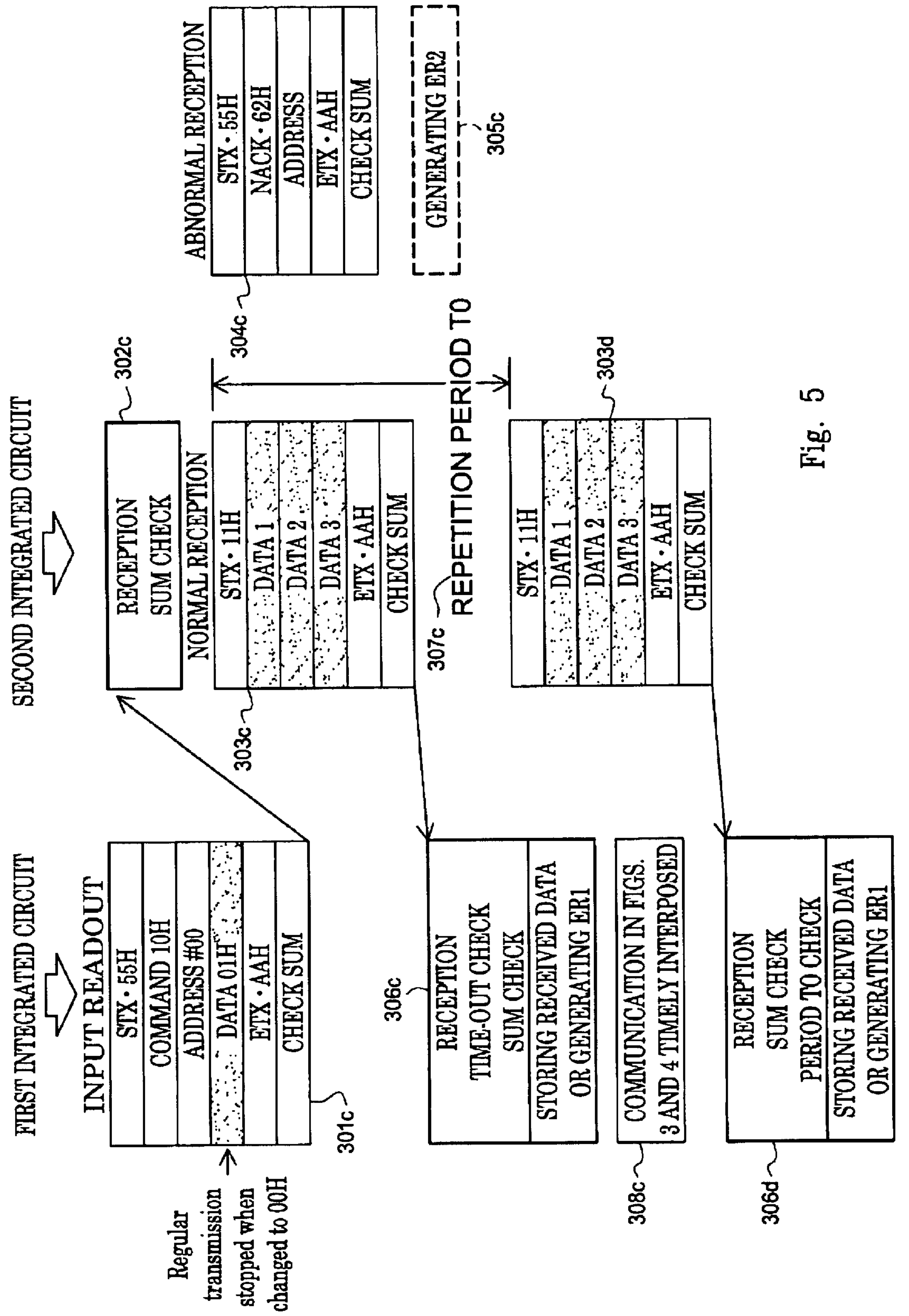
FIG. 5 is a block diagram of a frame constitution for serial communication in FIG. 1, and shows a case of transmitting an indirect input signal.

FIG. 5 shows a frame constitution in a case of transmitting an indirect output signal from the second LSI 120 (substation) to the first LSI 110 (master station). Transmission of the indirect input signal begins by transmitting an authorizing transmission frame 301*c* from the master station to the substation. The authorizing transmission frame 301*c* is composed of start data 55H, command 10H, storage destination addresses #00, transmission data 01H, end data AAH, and check sum data. Numeral 302*c* is a judgment block where the second LSI 120 receives a series of data of the mentioned authorizing transmission frame 301*c* and the data check circuit 122*a* of the communication control circuit 129 in FIG. 1 carries out sum check.

Numeral 303*c* is a normality reply frame sent back to the master station when the judgment block 302*c* judges the reception as being normal. The normality reply frame 303*c* is composed of start data 11H, data 1, data 2, data 3, end data AAH, and check sum data. Numeral 304*c* is an abnormality reply frame sent back to the master station when the judgment block 302*c* judges the reception as being abnormal. The abnormality reply frame 304*c* is composed of start data 55H, non-recognition data 62H, storage destination addresses, end data AAH, and check sum data. Numeral 305*c* is a block where the abnormality storage circuit 129*a* generates an abnormality storage output ER2 according to a signal from the communication control circuit 129 after sending back the abnormality reply frame 304*c*. Actually the abnormality storage output ER2 is generated after the retransmission confirmation processing.

Numeral 306*c* is a diagnostic block for carrying out sum check when the master station received the normality reply frame 303*c* or the abnormality reply frame 304*c* sent back by the substation or carrying out time-out check of reply response when the master station failed to receive the normality reply frame 303*c* or the abnormality reply frame 304*c*. If a diagnostic result of the diagnostic block 306*c* is abnormal, an abnormality diagnosis output ER1 described later is generated. Furthermore, if the abnormality still continues despite that the diagnostic block 306*c* normally received an abnormality reply frame 304*c* and the regular transmission frame 301*c* was transmitted again, the abnormality diagnosis output ER1 described later is generated.

When the mentioned diagnosis block 306*c* normally received the normality reply frame 303*c*, then the data 1, the data 2 and the data 3 normally read out are stored in a memory of a predetermined address.

In addition, unless the data of the mentioned authorizing transmission frame 301*c* are changed from 01H to 00H and transmitted from the master station to the substation, replies are continuously transmitted at intervals of a repetition period T0 shown in 307*c*. Numeral 303*d* is a continuous reply frame, and its constitution is the same as that of the mentioned normality reply frame 303*c*.

Numeral 306*d* is a diagnostic block where the master station receives the mentioned continuous reply frame 303*d* sent back by the substation, and sum check and time-out check of the repetition period T0 are carried out. If a diagnosis result of the diagnostic block 306*d* is abnormal, the next coming continuous reply frame 303*d* is diagnosed. If the abnormality still continues, the abnormality diagnosis output ER1 described later is generated. When the diagnostic block 306*d* normally received the continuous reply frame 303*d*, then the data 1, the data 2 and the data 3 normally read out are stored in a memory of a predetermined address.

In addition, the regular transmission frame 301*a* and the irregular transmission frame 301*b* are also transmitted utilizing an unoccupied time between continuous replies from the substation to the master station as shown in block 308*c*.

Figure 6:
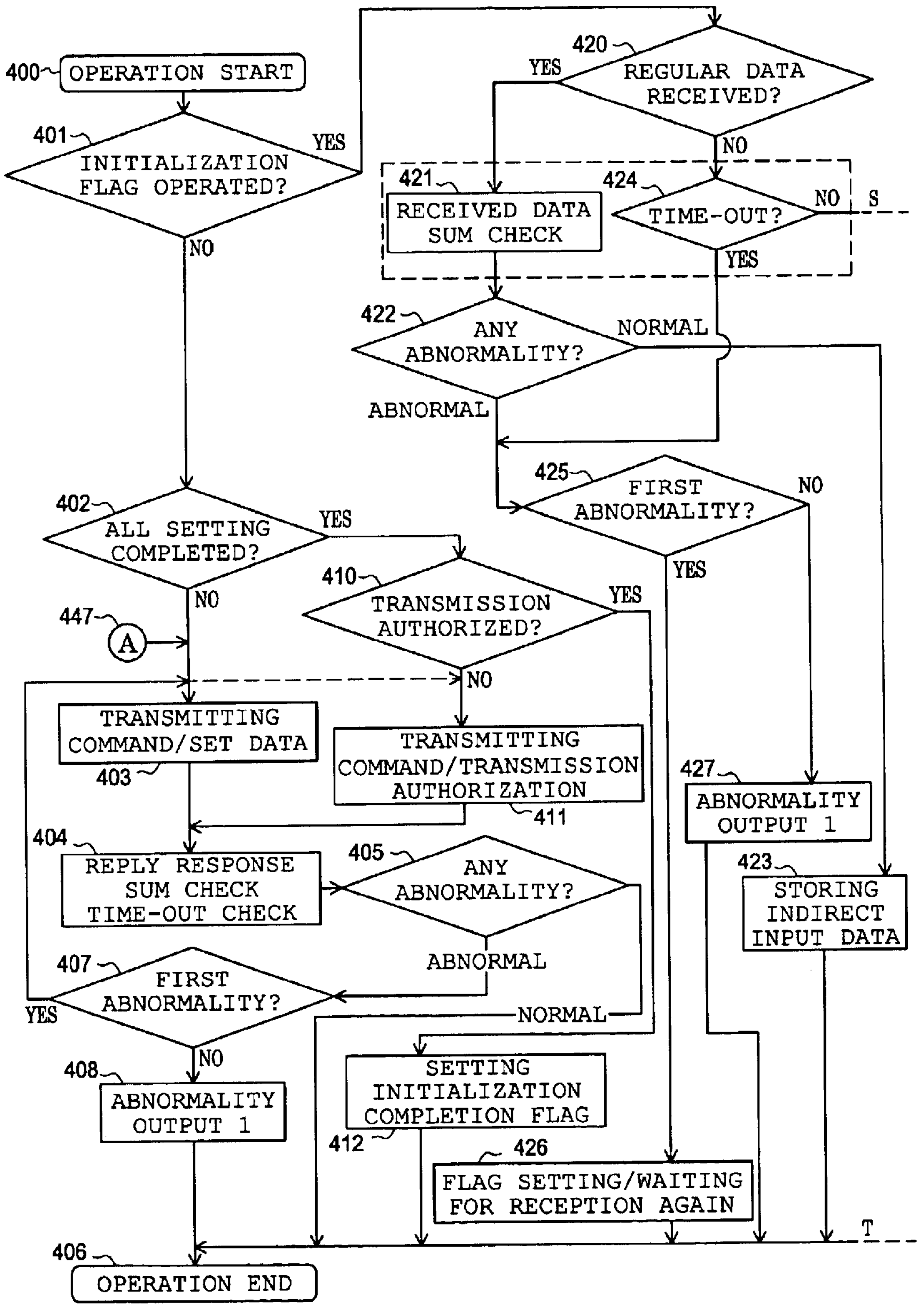
FIG. 6 is a flowchart for explaining the operation of communication in FIG. 1.

Embodiment 1 of above constitution shown in FIG. 1 is now described with reference to FIG. 6 and FIG. 7 showing flowcharts for explaining communication operation. Reference symbols S and T in FIG. 6 are connected to S and T in FIG. 7 respectively. Referring to FIGS. 6 and 7, numeral 400 is a step for starting operation of the microprocessor 111 activated at regular intervals. Step 400 is followed by step 401 for judging whether or not an initialization completion flag is set in step 412 described later. When a judgment in step 401 is NO, the processing program goes on to step 402 where it is judged whether or not constant setting have completed for all the constant setting registers 135*a* and 135*b*. If the judgment in step 402 is NO, the program goes on to step 403 where the regular transmission frame 301*a* in FIG. 3 transmits a set constant to either of the constant setting registers 135*a* or 135*b* of the first address. Step 403 is followed by step 404 where sum check and time-out check of the reply response data are carried out. The step 403 serves as means for transmitting set data.

In the mentioned step 404, sum check of the received data is immediately carried out when a reply response is received and the program goes on to next step 405, and when a reply is not obtained after waiting for a predetermined time in step 404, a time-out judgment is carried out and the program goes on to next step 405.

The step 404 is followed by step 405 for judging whether or not there is any sum check abnormality or a time-out abnormality in step 404. Numeral 406 is a step of ending operation when the result of judgment in step 405 is normal. In the step of ending operation, the mentioned step 400 for starting operation is activated again, whereby the control operation is repeated again. When the step 400 for starting operation is activated again, if an initialization flag, which is set in step 412 described later, has not been set yet and constant setting for all the constant setting registers 135*a* and 135*b* has not completed yet, constant setting for the remaining constant setting registers 135*a* and 135*b* are sequentially carried out by repeating the mentioned steps 401, 402, 403, 404, and 405.

However, if there is any abnormality as a result of judgment in the mentioned step 405, the program goes on to step 407 where it is judged whether or not the abnormality judged in step 405 is a first abnormality, and if it is judged the first one, the program goes back to the mentioned step 403 and set data are transmitted again. If the abnormality is not the first one as a result of judgment in the mentioned step 407, this means that the abnormality still continues in spite of the retransmission. Accordingly, in this case, the program goes on to step 408 where an abnormality diagnosis output ER1 is generated, and the program goes on to step 406 for ending operation.

The foregoing operations are repeated, and if it is judged that constant setting for all the constant setting registers 135*a* and 135*b* has completed in step 402, the program goes on to step 410. In step 410, it is judged whether or not the authorizing transmission frame 301*c* in FIG. 5 has been transmitted, and if the authorizing transmission frame 301*c* has not been transmitted yet, the program goes on to step 411 acting as means for authorizing transmission, and the authorizing transmission frame 301*c* is transmitted. Thereafter, step 404, step 405, step 407, step 408, and so on are selectively operated, and the operation is the same as in the case of carrying out step 403. However, in a case where the abnormality is the first one as a result of judgment in step 407 and retransmission shall be carried out, the program goes on to step 411. In a case where it is judged in step 410 that the authorizing transmission frame 301*c* has been already transmitted, the program goes on to step 412 where the initialization completion flag is set, and the program goes on to step 406 for ending operation.

Operation of the abnormality diagnosis output ER1 in step 408 and that of the initialization completion flag in step 412 are maintained until the power is turned on again.

After completing the constant setting for all the constant setting registers 135*a* and 135*b*, authorizing the transmission from the second LSI 120 to the first LSI 110 is authorized, and setting the initialization completion flag through the foregoing operations, the program goes on from step 400 for starting operation to step 420 through step 401.

Numeral 420 is a step of judging whether or not the master station has received the continuous reply frame 303*d* (normality reply frame 303*c* or abnormality reply frame 304*c* in the first receiving) in FIG. 5. When a result of judgment in step 420 is YES, the program goes on to step 421 for carrying out sum check of the received data. This step 421 is followed by step 422, and the program goes on to step 425 if there is any abnormality in the received data, while the program goes on to step 423 if the received data are normal. Numeral 423 is a step of storing the received indirect input data in the RAM memory 113.

When the judgment result of the mentioned step 420 is NO, the program goes on to step 424 for judging whether or not regular data are received at intervals of a time exceeding a predetermined time corresponding to the repetition period T0 in FIG. 5. If a time-out is judged in step 424, the program goes on to step 425. If any time-out is not judged, the program goes on to step 430 in FIG. 7. Numeral 425 is a step of judging whether or not the abnormality judged in the foregoing step 422 or step 424 is the first one. If the abnormality is the first one, the program goes on to step 426 of setting a first-time flag, and if the abnormality is not the first one, the program goes on to step 427 for generating the abnormality diagnosis output ER1. Following the step 426, step 427 and step 423, the program goes on to step 406 for ending operation, and step 400 for starting operation is activated again.

Numeral 428 is regular input receiving means composed of the mentioned step 421 and step 424.

Referring now to FIG. 7, numeral 430 is a step that operates when any time-out has not been judged in the mentioned step 424, and in which it is judged whether or not it is time for regular transmission of an indirect output signal. When the result of judgment in step 430 is YES, the program goes on to step 431 where the regular transmission frame 301*a* in FIG. 3 transmits indirect input data to the latch memory 125. This step 431 acts as regular output transmitting means.

The mentioned step 431 is followed by step 432 for carrying out sum check and time-out check of reply response data. In this step 432, sum check of the received data is immediately carried out upon receipt of a reply response, and the program goes on to next step 433. However, if any reply is not obtained after waiting for a predetermined time in step 432, a time-out judgment is carried out and the program goes on to next step 433.

The foregoing step 432 is followed by step 433 for judging whether any sum check abnormality or a time-out abnormality in step 432 occurs. If normality is judged in step 433, the program goes on to step 406 for ending operation. In the step for ending operation, the mentioned step 400 for staring operation is activated again, whereby the control operation is repeated again.

On the other hand, if any abnormality is judged in step 433, the program goes on to step 434 for judging whether or not the abnormality judged in step 433 is the first one. If it is judged the first abnormality, the program goes back to step 431, and the output data are transmitted again. If it is judged not the first abnormality in step 434, this means that the abnormality still continues in the retransmission. Accordingly, in this case, the program goes on to step 435 where an abnormality diagnosis output ER1 is generated, and the program goes on to step 406 for ending operation.

When it is judged NO in step 430, the program goes on to step 441 for requesting readout (readout requesting means) where the irregular transmission frame 301*b* in FIG. 4 sequentially reads out the set contents of the constant setting registers 135*a* and 135*b*. The mentioned step 441 is followed by step 442 for carrying out sum check and time-out check of the reply response data. In step 442, sum check of the received data is immediately carried out upon receipt of a reply response, and the program goes on to next step 443. If any reply is not obtained after waiting for a predetermined time in step 442, time-out judgment is carried out and the program goes on to next step 443.

The mentioned step 442 is followed by step 443 for judging whether or not there is any sum check abnormality or any time-out abnormality in step 442. If there is any abnormality as a result of judgment in step 443, the program goes on to step 444 for judging whether or not the abnormality judged in step 443 is the first one. If it is judged the first one, the program goes back to the foregoing step 441, and the readout request is transmitted again. If it is judged not the first abnormality in step 444, this means the abnormality still continues in the retransmission. Accordingly, in this case, the program goes on to step 445 where an abnormality diagnosis output ER1 is generated, and the program goes on to step 406 for ending operation.

When it is judged normal in the mentioned step 443, the program goes on to a judgment step 446 for comparing the received contents of the constant setting registers 135*a* and 135*b* with the content of the nonvolatile memory 112, and this step 446 acts as constant comparison monitoring means. If the contents are coincident as a result of the comparison in the judgment step 446, the program goes on to step 406 for ending operation. In this step for ending operation, the mentioned step 400 for starting operation is activated again, whereby the foregoing step 441 is operated again. Thus addresses of the constant setting registers 135*a* and 135*b* are updated, and are sequentially read out and compared.

On the other hand, if the contents are not coincident as a result of comparison in the mentioned judgment step 446, the program goes on to step 403 in FIG. 6 via a relay terminal 447, and set data are transmitted to the constant setting registers whose content is not coincident to the that of the nonvolatile memory.

In Embodiment 1 constituted as shown in FIG. 1, the entire operation is summarized as follows. The microprocessor 111 is operated by an analog input or an ON/OFF direct input connected to the data bus 118, an ON/OFF indirect input inputted through serial communication, and the content of the nonvolatile memory 112, and controls a direct output connected to the data bus 118 and an indirect output outputted through the serial communication. The external tool 108 preliminarily writes a control program, a control constant, and set values for the constant setting registers 135*a* and 135*b*, in the nonvolatile memory 112.

When the power of the ECU 100 is turned on in the driving stage, a threshold constant and a filter constant, i.e., control constant is transmitted from the nonvolatile memory 112 to the constant setting registers 135*a* and 135*b* and, subsequently, the indirect inputs and indirect outputs are regularly serial-communicated.

Indirect inputs and indirect outputs operated infrequently at a low speed are selected, and therefore using a serial communication does not bring about any problem, and as a result, number of input/output pins of the first integrated circuit 110 is considerably reduced.

Description of Embodiment 2

Figure 8:
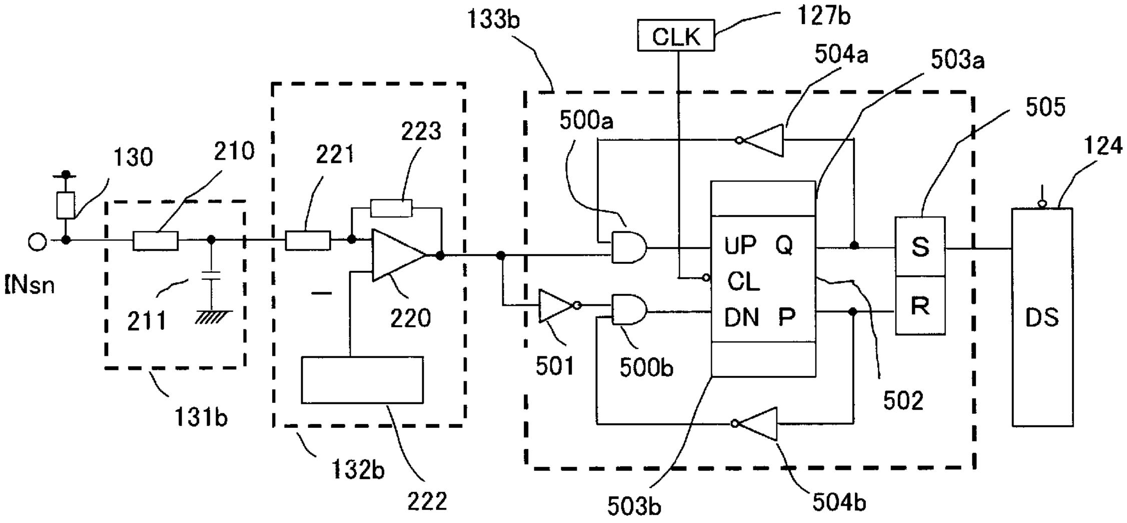
FIG. 8 is a block circuit diagram showing a variable filter used in Embodiment 2 of the invention.
Figure 9:
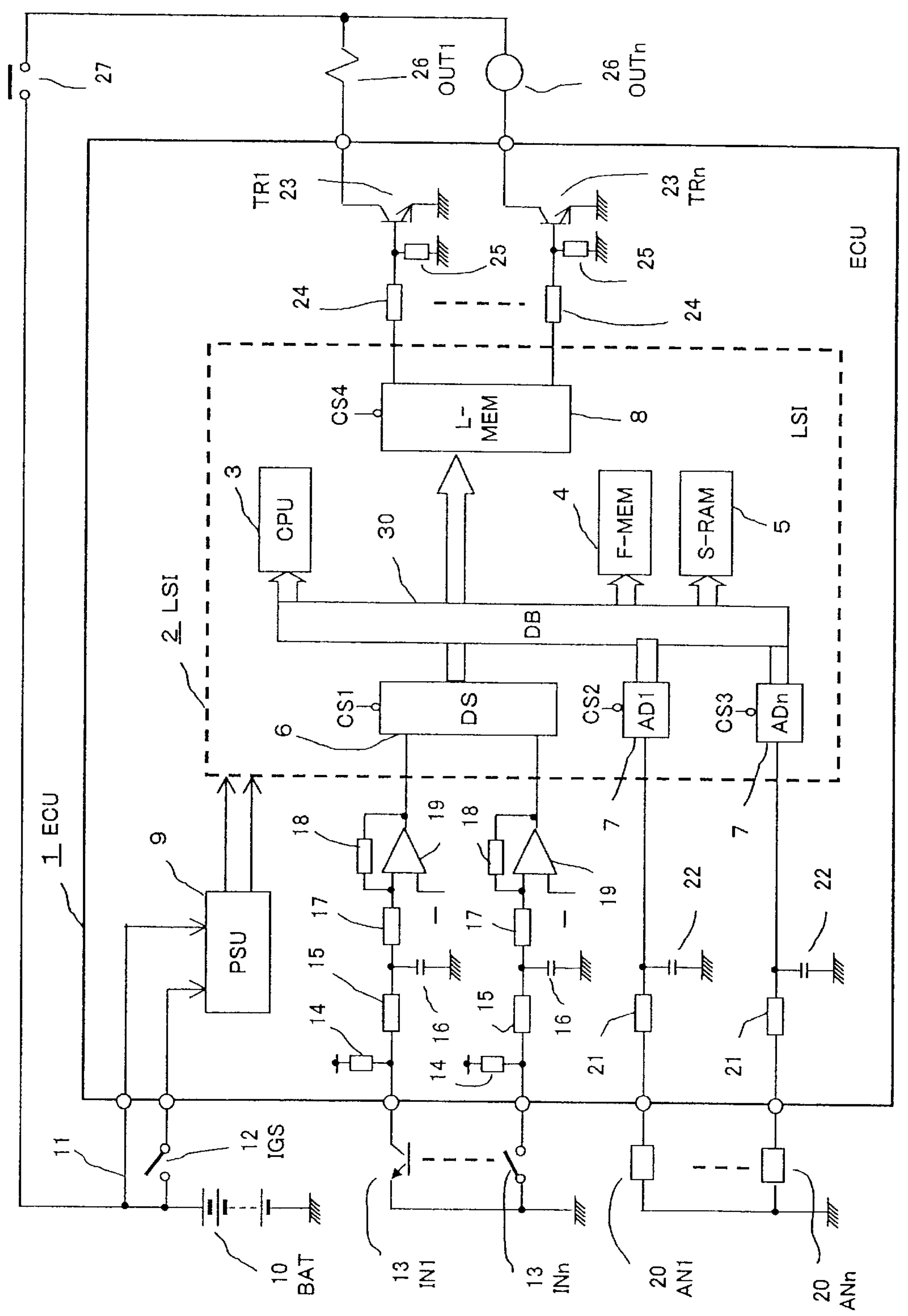
Prior Art Fig.9
FIG. 9 is a block circuit diagram entirely showing a conventional on-vehicle electronic controller.

FIG. 8 is a block circuit diagram showing a variable filter for ON/OFF signals used in Embodiment 2 of the invention. Referring to FIG. 8, the mentioned input signal INsn including the bleeder resistors 130 of low resistance is connected to a parallel small capacitor 211 of over ten pF via the series resistors 210 of high resistance of hundreds KΩ, which is an upper limit of practical use. Numeral 131*b* is a noise filter composed of series resistors 210 and a small capacitor 211. The noise filter 131*b* absorbs and smoothes high-frequency noises. Numeral 132*b* is a level judging comparator composed of the input resistors 221, the reaction resistor 223, and the comparator 220. A predetermined reference voltage 222 (voltage Von) is applied to the inverted input of the comparator 220.

Therefore, when a charging voltage of the small capacitor 211 reaches the reference voltage Von, the output of the comparator 220 becomes "H" (logic "1"). Once the output of the comparator 220 becomes "H", an input by the reaction resistor 223 is added thereto, and therefore the comparator 220 has a hysteresis function so that the output of the comparator 220 does not become "L" (logic "0") unless the charging voltage of the small capacitor 211 lowers to Voff (<Von). This prevents the output of the comparator 220 from being inverted and changed frequently due to noise ripples superposed by the small capacitor 211.

Numeral 500*a* is a gate element connected between an output terminal of the comparator 220 and a count-up mode input UP of a reversible counter 502. Numeral 501 is a logical inversion element connected from the output terminal of the comparator 220 to a count-down mode input DN of the reversible counter 502 via a gate element 500*b*. The reversible counter 502 includes a clock input terminal CL connected to a clock generator 127*b* that turns on and off at a predetermined period, and is constituted to reversibly count the clock inputs according to the mode input UP and DN.

Numeral 503*a* is a constant setting register in which a set value corresponding to a logic judgment number N is stored. Numeral 503*b* is a current value register in which a current value of the reversible counter 502 is stored. Numeral 504*a* is a logical inversion element that closes the gate element 500*a* according to an output Q that becomes logic "1" when a current value of the reversible counter 502 reaches the set value N, so as to prevent further count-up. Numeral 504*b* is a logical inversion element that closes the gate element 500*b* according to an output P that becomes logic "1" when a current value of the reversible counter 502 becomes 0, so as to prevent further count-down. Numeral 505 is an input deciding register composed of a flip-flop element that is set by the set value reach output Q of the mentioned reversible counter 502 and reset by the current value 0 output P. An output of the input deciding register 505 is connected to an input terminal of the input data selector 124.

In the reversible counter 502 constituted as described above, if an output of the comparator 220 is continuously "H" until an input pulse number of the clock input CL operated at the period T reaches a value N set by the constant setting register 503*a*, an input deciding register 505 is set. However, if an output of the comparator 220 becomes "L" before the input pulse number reaches the set value N, count-down of the clock input is carried out, and count-up is carried out after the output of the comparator 220 becomes "H" again. When the current value reaches the set value N, the input deciding register 505 is set.

In the same manner, once the input deciding register 505 is set, if an output of the comparator 220 is continuously "L" until the current value is reduced from the set value N to 0 according to the input pulse of the clock input CL operated at a period T, the input deciding register 505 is reset. If an output of the comparator 220 becomes "H" before the current value is reduced to 0, count-up of the clock input is carried out, and count-down is carried out after the output of the comparator 220 becomes "L" again, and when the current value reaches 0, the input deciding register 505 is reset.

Instead of variably setting a logic judgment number according to a set value of the reversible counter 502 as described above, it is also preferable to variably set a pulse period of the clock generator 127*b*.

Description of Embodiment 3

Although the foregoing Embodiment 1 shown in FIG. 1 does not handle any analog output, it is also preferable to mount a D/A converter for meter display as an indirect output if required. Since number of such analog outputs and low-speed outputs of ON/OFF operation is not very large in practical use, it is also preferable to directly output all the signals from the latch memory 115 on the microprocessor 111 without depending on serial communication.

From the viewpoint of fail-safe driving, it is important to input minimum input data, including input signals of low-speed operation, required to maintain an engine speed directly to the microprocessor 111 so as not to depend on any serial communication.

Although, in the foregoing Embodiment 1 shown in FIG. 1, the clock generator 127 is arranged in the second LSI 120, it is also preferable to add a clock signal line in the serial communication line to carry out synchronous control using a clock signal on the microprocessor 111. The various kinds of clock generators 127*a* and 127*b* in FIG. 2 and FIG. 8 are composed of a divider circuit for dividing the fundamental clock signal.

It is possible to connect a DMAC (direct memory access controller) to the data bus 118 on the microprocessor 111 and directly transmit and receive data to and from the RAM memory 113 on the basis of a serial-parallel conversion completion signal from the first serial-parallel converter 116 during an internal computation period in which the microprocessor 111 does not use the data bus 118. Consequently, it is possible to shorten the time required for serial communication and lighten the burden on the microprocessor 111

Further features and advantages of the on-vehicle electronic controller according to the invention are additionally described below.

In the mentioned on-vehicle electronic controller, the mentioned indirect input interface circuit preferably includes: a noise filter having bleeder resistors acting as a load on an input switch, series resistors, and parallel capacitors; a level judging comparator that is connected to the mentioned noise filter and has hysteresis function; and the mentioned variable filter circuit connected to this level judging comparator; and in which the mentioned variable filter circuit includes an input deciding register, which is set when a plurality of successive level judgment results sampled and stored at a predetermined period are logic "1" and is reset when the plurality of successive level judgment results are logic "0", and constant setting registera where at least one of values of the mentioned sampling period and logical judgment number for carrying out setting and resetting is stored; an output of the mentioned input deciding register is serially transmitted to the mentioned RAM memory; and at least one of the values of the mentioned sampling period and the logical judgment number for carrying out setting and resetting is serially transmitted from the mentioned nonvolatile memory to the mentioned constant setting registers.

As a result, in the on-vehicle electronic controller of the invention of above constitution, any high-frequency noise is removed by the noise filter and the level judging comparator acting as the input interface circuit for ON/OFF signals, and consequently it is possible to perform an advantage such that the value set for the mentioned constant setting registers is reduced and the variable filter circuit is constituted at a reasonable cost.

Further, in the mentioned on-vehicle electronic controller, the mentioned direct input interface circuit preferably includes: a noise filter having a bleeder resistors acting as a load on an input switch, series resistors, and parallel capacitors; and a level judging comparator that is connected to the mentioned noise filter and has a hysteresis function; and in which the mentioned level judging comparator includes a variable threshold circuit having constant setting registers for setting a threshold constant acting as a judgment level, and the mentioned threshold constant is serially transmitted from the mentioned nonvolatile memory to the mentioned constant setting registers.

As a result, in the on-vehicle electronic controller of above constitution, direct input signal for high-speed operation become less sensitive to high-frequency noises, and it is possible to standardize the on-vehicle electronic controller as a simple variable filter circuit.

Further, the mentioned on-vehicle electronic controller preferably includes an analog input interface circuit connected to the data bus of the mentioned microprocessor via an A/D converter, and in which the mentioned A/D converter is formed into a multiple system for a part of analog input signals.

As a result, the microprocessor handles the analog input signals, and consequently it is possible to reduce the burden on the serial communication circuit. Furthermore, analog input signals constituted into a dual system are used, and therefore safety can be improved.

Further, in the mentioned on-vehicle electronic controller, a load relay for opening and closing a load power supply is preferably connected to an indirect output interface circuit for the mentioned low-speed output signals of the auxiliary driving output and the alarm display output, and in which the mentioned load relay is connected via a logic gate circuit capable of being stopped driving by either the mentioned communication control circuit for serial communication or the mentioned microprocessor.

As a result, in the on-vehicle electronic controller of above constitution, not only the communication control circuit for serial communication but also the microprocessor can drive and stop the load relay, which improves control safety.

Further, in the mentioned on-vehicle electronic controller, the mentioned microprocessor preferably includes: set data transmitting means for sequentially transmitting a control constant stored in the mentioned nonvolatile memory, together with address data for identifying the constant setting registers where the constant is to be stored from the mentioned microprocessor, to a specified constant setting register via the mentioned first/second serial-parallel converter; and regular output transmitting means for transmitting the mentioned ON/OFF data for the low-speed output signals, together with address data for identifying latch memories where the data are to be stored from the mentioned microprocessor, to a specified latch memory via the mentioned first/second serial-parallel converter at regular intervals; and in which the mentioned communication control circuit for serial communication includes a data check circuit for checking data received by the mentioned second serial-parallel converter and a time-out check circuit for checking time-out of receiving interval of the data.

As a result, in the on-vehicle electronic controller of above constitution, it is possible to simplify the communication control circuit composed of hardware and improve safety by diagnosing the communication by the hardware.

Further, in the mentioned on-vehicle electronic controller, the mentioned microprocessor preferably includes: transmission authorizing means for authorizing the mentioned communication control circuit for serial communication to transmit an indirect input signal to the mentioned microprocessor at regular intervals; and regular input receiving means for receiving ON/OFF data that handle the indirect input signal transmitted from the mentioned second serial-parallel converter to the mentioned microprocessor via the mentioned first serial-parallel converter, and in which the mentioned regular input receiving means carries out data check of the indirect input signal and time-out check of receiving interval of the data.

As a result, in the on-vehicle electronic controller of above constitution, it is possible to perform advantages such that operation of the communication control circuit including the hardware is simplified and any abnormality in the communication circuit is diagnosed by software on the microprocessor.

Further, in the mentioned on-vehicle electronic controller of above constitution, the mentioned microprocessor preferably includes: readout request means by which the mentioned microprocessor requests readout of the stored data specifying an address of the mentioned constant setting registers, during a time after one indirect input signal is received by the mentioned microprocessor and before the next coming indirect input signal is received by the mentioned microprocessor using the mentioned regular input receiving means; and in which the mentioned communication control circuit for serial communication having received the mentioned readout request sends back the control constant stored in the constant setting register of the specified address.

As a result, in the on-vehicle electronic controller of above constitution, the data stored in the constant setting registers are sequentially read out utilizing the regular intervals between readouts of the indirect input signals. Consequently, timely interposing different data utilizing the regular intervals makes it possible to detect any abnormality in the hardware of the serial-parallel converter and so on thereby safety being improved.

Further, in the on-vehicle electronic controller of above constitution, the mentioned microprocessor preferably includes: constant comparison monitoring means for comparing a control constant sent back in response to the readout request with a control constant stored in the mentioned nonvolatile memory; and in which when the control constants are not coincident as a result of comparison, the control constant stored in the mentioned nonvolatile memory is transmitted together with the address data identifying the constant setting registers whose control constant is not coincident to the control constant stored in the nonvolatile memory.

As a result, in the on-vehicle electronic controller of above constitution, whether or not a control constant of the constant setting registers written at the time of starting the operation remains unchanged is inspected not in a concentrated manner but sequentially in order, and consequently it is possible to improve safety.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An on-vehicle electronic controller comprising:

a microprocessor having a nonvolatile memory, in which a control program for a controlled vehicle and a control constant are written by an external tool, and a RAM memory for computation;

direct input interface circuits and direct output interface circuits that are connected to a data bus of said microprocessor and handle high-speed inputs and outputs for engine drive control;

a first serial-parallel converter connected to said microprocessor via the data bus, a second serial-parallel converter serially connected to said first serial-parallel converter, and a communication control circuit for serial communication connected to said second serial-parallel converter via a data bus;

an output latch memory for storing control output signals transmitted via said first and second serial-parallel converters with respect to low-speed output signals of an auxiliary driving output and an alarm display output, and an indirect output interface circuit connected to an output terminal of said output latch memory;

indirect input interface circuits each having a variable filter circuit provided with constant setting registers in which a filter constant is stored, and to which manually controlled low-speed input signals are inputted;

wherein a plurality of ON/OFF information data inputted via said indirect input interface circuits are serially transmitted to said RAM memory, and a filter constant of the control constant stored in said nonvolatile memory is serially transmitted to said constant setting registers.

2. The on-vehicle electronic controller according to claim 1, wherein said indirect input interface circuit includes: a noise filter having bleeder resistors acting as a load on an input switch, series resistors, and parallel capacitors; a level judging comparator that is connected to said noise filter and has a hysteresis function; and said variable filter circuit connected to said level judging comparator; and wherein said variable filter circuit includes: an input deciding register, which is set when a plurality of sequential level judgment results sampled and stored at a predetermined period are logic “1”, and is reset when the plurality of sequential level judgment results are logic “0”; and constant setting registers where at least one of values of said sampling period and a logical judgment number for carrying out setting and resetting is stored; an output of said input deciding register is serially transmitted to said RAM memory; and at least one of the values of said sampling period and the logical judgment number for carrying out setting and resetting is serially transmitted from said nonvolatile memory to said constant setting registers.

3. The on-vehicle electronic controller according to claim 1, wherein said direct input interface circuit includes: a noise filter having a bleeder resistors acting as a load on an input switch, series resistors, and parallel capacitors; and a level judging comparator that is connected to said noise filter and has a hysteresis function; and wherein said level judging comparator includes a variable threshold circuit having constant setting registers for setting a threshold constant acting as a judgment level, and said threshold constant is serially transmitted from said nonvolatile memory to said constant setting registers.

4. The on-vehicle electronic controller according to claim 1, further comprising an analog input interface circuit connected to the data bus of said microprocessor via an A/D converter, wherein said A/D converter is formed into a multiple system for handling a part of analog input signals.

5. The on-vehicle electronic controller according to claim 1, wherein a load relay for opening and closing a load power supply is connected to an indirect output interface circuit for handling said low-speed output signals of the auxiliary driving output and the alarm display output, and wherein said load relay is connected via a logic gate circuit capable of being stopped driving by either said communication control circuit for serial communication or said microprocessor.

6. The on-vehicle electronic controller according to claim 1, wherein said microprocessor includes: set data transmitting means for sequentially transmitting a control constant stored in said nonvolatile memory, together with address data for identifying the constant setting registers where the constant is to be stored from said microprocessor, to a specified constant setting register via said first and second serial-parallel converters; and regular output transmitting means for transmitting said ON/OFF data that handle the low-speed output signals, together with address data for identifying latch memories where the data are to be stored from said microprocessor, to a specified latch memory via said first and second serial-parallel converters at regular intervals; and wherein said communication control circuit for serial communication includes a data check circuit for checking data received by said second serial-parallel converter and a time-out check circuit for checking timeout of receiving interval of the data.

7. The on-vehicle electronic controller according to claim 1, wherein said microprocessor includes: transmission authorizing means for authorizing said communication control circuit for serial communication to transmit an indirect input signal to said microprocessor at regular intervals; and regular input receiving means for receiving ON/OFF data that handle the indirect input signal transmitted from said second serial-parallel converter to said microprocessor via said first serial-parallel converter; and wherein said regular input receiving means carries out data check of the indirect input signal and time-out check of receiving interval of the data.

8. The on-vehicle electronic controller according to claim 7, wherein said microprocessor includes: readout request means by which said microprocessor requests readout of the stored data specifying an address of said constant setting registers, during a time after one indirect input signal is received by said microprocessor and before next coming indirect input signal is received by said microprocessor using said regular input receiving means; and wherein said communication control circuit for serial communication having received said readout request sends back the control constant stored in the constant setting registers of the specified address.

9. The on-vehicle electronic controller according to claim 8, wherein said microprocessor includes: constant comparison monitoring means for comparing a control constant sent back in response to the readout request with a control constant stored in said nonvolatile memory; and wherein when the control constants are not coincident as a result of comparison, the control constant stored in said nonvolatile memory is transmitted together with the address data identifying the constant setting registers whose control constant is not coincident to the control constant stored in the nonvolatile memory.

* * * * *